US012553590B1

(12) United States Patent
Ying et al.

(10) Patent No.: US 12,553,590 B1
(45) Date of Patent: Feb. 17, 2026

(54) SYNCHRONIZED LIGHT BOARD AND HEAT SINK ROTATION FOR ILLUMINATION BEAM REDIRECTION

(71) Applicant: RAB Lighting Inc., New York, NY (US)

(72) Inventors: Zhangyong Ying, Ningbo (CN); Jiang Hu, Ningbo (CN); Hongjun Lui, Ningbo (CN); Stephen Osborne, Glen Arm, MD (US)

(73) Assignee: RAB Lighting Inc., New York, NY (US)

( * ) Notice: Subject to any disclaimer, the term of this patent is extended or adjusted under 35 U.S.C. 154(b) by 0 days.

(21) Appl. No.: 19/192,904

(22) Filed: Apr. 29, 2025

(51) Int. Cl.

| | |
|---|---|
| ***F21V 14/02*** | (2006.01) |
| ***F21V 15/01*** | (2006.01) |
| ***F21V 21/30*** | (2006.01) |
| ***F21V 29/71*** | (2015.01) |
| ***F21V 29/73*** | (2015.01) |

(Continued)

(52) U.S. Cl.
CPC .............. *F21V 14/02* (2013.01); *F21V 15/01* (2013.01); *F21V 21/30* (2013.01); *F21V 29/713* (2015.01); *F21V 29/73* (2015.01); *F21V 29/76* (2015.01); *F21Y 2115/10* (2016.08)

(58) Field of Classification Search
CPC ........ F21V 29/763; F21V 29/74; F21V 29/71; F21V 29/75; F21V 14/02; F21V 17/02; F21V 21/14; F21V 29/70; F21V 29/713; F21V 15/01; F21V 29/73; F21V 21/30; F21S 45/47
See application file for complete search history.

(56) References Cited

U.S. PATENT DOCUMENTS

| | | | | |
|---|---|---|---|---|
| 8,061,869 B2 * | 11/2011 | Lo | ........................... | F21S 2/005 362/249.02 |
| 9,546,783 B2 * | 1/2017 | Lo | ........................... | F21S 2/005 |
| 9,657,933 B2 * | 5/2017 | Clark | ...................... | F21V 14/02 |

(Continued)

FOREIGN PATENT DOCUMENTS

| | | |
|---|---|---|
| CN | 109210441 A | 1/2019 |
| CN | 208504130 U | 2/2019 |

(Continued)

*Primary Examiner* — William J Carter
(74) *Attorney, Agent, or Firm* — Innovation Law Office; Dennis S. Schell

(57) ABSTRACT

Illustrative embodiments of a light fixture are disclosed that feature a housing and an internal optical module. The optical module includes one or more light emitter assemblies that are rotationally adjustable and a fixed primary heat sink. Each light emitter assembly includes a light emitter member, an intermediate rotatable heat sink, and an optional optic. The primary heat sink within the housing provides thermally conductive surfaces that maintain contact with the intermediate heat sinks throughout their range of rotation with the light emitter members. A synchronization mechanism ensures coordinated rotation of the light emitter assemblies. The fixture may also include a lens that encloses the optical module within the housing and an actuator for adjusting the rotation of the light emitters from outside the housing. The design allows for efficient thermal management and adjustable light beam direction with no change in position of the external housing or the mounting structure.

23 Claims, 9 Drawing Sheets

(51) Int. Cl.
*F21V 29/76* (2015.01)
*F21Y 115/10* (2016.01)

(56) References Cited

U.S. PATENT DOCUMENTS

| | | | | |
|---|---|---|---|---|
| 2008/0089071 | A1* | 4/2008 | Wang | F21V 29/75<br>362/294 |
| 2012/0223640 | A1* | 9/2012 | Koplow | F04D 29/582<br>361/689 |
| 2016/0356483 | A1* | 12/2016 | Gebhard | F21V 29/83 |

FOREIGN PATENT DOCUMENTS

| | | | |
|---|---|---|---|
| CN | 113932173 | A | 1/2022 |
| CN | 215674886 | U | 1/2022 |
| CN | 218178712 | U | 12/2022 |
| CN | 115712215 | A | 2/2023 |
| CN | 218863951 | U | 4/2023 |
| CN | 219102766 | U | 5/2023 |
| CN | 220228985 | U | 12/2023 |
| CN | 220471410 | U | 2/2024 |

* cited by examiner

SYNCHRONIZED LIGHT BOARD AND HEAT SINK ROTATION FOR ILLUMINATION BEAM REDIRECTION

TECHNICAL FIELD

Illustrative embodiments of this disclosure relate generally to adjustable optics for light fixtures, and more particularly to illumination beam adjustment for light fixtures.

BACKGROUND

In the realm of lighting technology, the demand for more efficient and adaptable lighting solutions has been on the rise. Traditional lighting systems typically require changing the mounting angle or other repositioning of a portion of the housing of or the entire light fixture to achieve a desired beam direction, which can require a cumbersome and protruding mounting system and can be inefficient. This is particularly challenging in applications where space is limited or where it is desirable that the aesthetic appearance of the fixture remains unchanged. The need for innovative solutions that allow for easy and precise control of light direction without altering the fixture's external appearance or mounting configuration is becoming increasingly important.

Moreover, managing heat dissipation in compact lighting systems is a critical challenge, particularly for high lumen output lighting installations. Effective thermal management is essential to maintain the performance and longevity of light-emitting components such as LEDs. Conventional heat sinks often require significant space, which can limit design flexibility and increase the size of the lighting fixture. As lighting technology continues to evolve, there is a pressing need for solutions that integrate efficient thermal management with compact and adaptable design, ensuring both optimal performance and aesthetic appeal of the light fixture housing and any mounting features.

Certain features of the present disclosure address this and provide other important advantages.

SUMMARY

A light fixture is disclosed that features a housing and an internal optical module. The optical module includes one or more light emitter assemblies that are rotationally adjustable and a fixed primary heat sink. Each light emitter assembly includes a light emitter member, an intermediate rotatable heat sink, and an optional optic. A fixed primary heat sink within the housing provides thermally conductive surfaces that maintain contact with the intermediate heat sinks throughout their range of rotation with the light emitter members. A synchronization mechanism ensures coordinated rotation of the light emitter assemblies. The fixture may also include a lens that encloses the optical module within the housing and an actuator for adjusting the rotation of the light emitters from outside the housing. The design allows for efficient thermal management and adjustable light beam direction with no change in position of the external housing or the mounting structure.

In a first illustrative embodiment, the light fixture may include a housing and at least two light emitter assemblies that can rotate and are connected to the housing. Each assembly may have a light emitter and a rotatable heat sink. A fixed heat sink can be placed within the housing, featuring at least two thermally conductive surfaces that may contact the rotatable heat sinks as the assemblies rotate. A synchronization mechanism can be connected to the light emitter assemblies to coordinate their rotation.

Each light emitter assembly may also include an optic, enhancing the light fixture's functionality. The rotatable heat sinks can be thermally connected to the back of the light emitters and may have semicylindrical surfaces that contact the fixed heat sink's conductive surfaces. The synchronization mechanism may include a rigid linkage that connects the light emitter assemblies, ensuring synchronized movement. The synchronization mechanism can also feature a hub at the end of each light emitter assembly, with the rigid linkage connecting these hubs. The rigid linkage may connect to each hub at different radii from the hub centers, allowing for varied rotation rates of the light emitter assemblies. The rigid linkage can also connect to opposite halves of the hubs, enabling different rotation directions for the assemblies.

An optical module may be part of the light fixture, comprising the light emitter assemblies, fixed heat sink, and synchronization mechanism. The light fixture can include a lens and an actuator that is accessible from the exterior of the housing, allowing for the rotation of the light emitter assemblies. The housing and lens may enclose the optical module. Each rotatable heat sink may be shaped like a half-cylinder.

For another illustrative embodiment, a light fixture may also include a housing with a first light emitter that can rotate and is connected to the housing. A first intermediate heat sink may have a semicylindrical surface and be thermally connected to the light emitter. A primary heat sink can be fixed to the housing, providing a surface for thermal contact with the intermediate heat sink. An actuator may enable the rotation of the light emitter, altering the emitted light beam, while maintaining thermal contact through the rotation range.

The light fixture may also include an optical module with the first light emitter, intermediate heat sink, and primary heat sink. A lens can be part of the fixture, with the housing and lens enclosing the optical module. The actuator may extend through the housing, allowing for external adjustment of the light emitter's rotation. A second light emitter and intermediate heat sink may be included, with the primary heat sink providing additional thermal contact surfaces. A synchronization mechanism can connect the first and second light emitters with a rigid linkage. The synchronization mechanism may include hubs mounted to the ends of the light emitters or heat sinks, with the rigid linkage connecting these hubs. The rigid linkage can attach to the hubs at different radii, allowing for different rotation rates of the light emitters. The linkage may also attach to opposite halves of the hubs, providing different rotation directions.

The first and second intermediate heat sinks can remain in contact with and thermally coupled to the primary heat sink throughout a range of rotation of the first and second light emitter members of at least 40 degrees. The light fixture may include a first plurality of light emitters mounted to the first light emitter member. The first semicylindrical heat transfer surface may span the length of the first plurality of light emitters. The second semicylindrical heat transfer surface may span the length of the first semicylindrical heat transfer surface.

In yet another illustrative embodiment, a light fixture may include a housing and an optical module with first and second light emitters, intermediate heat sinks, and a primary heat sink with multiple thermal contact surfaces. Hubs and a rigid linkage can connect the emitters, with an end cover guiding the hubs. An actuator may enable rotation, maintaining thermal contact throughout the rotation range. A lens can be included, with the housing and lens enclosing the optical module.

This summary is provided to introduce a selection of the concepts that are described in further detail in the detailed description and drawings contained herein. This summary is not intended to identify any primary or essential features of the subject matter. Some or all the described features may be present in the corresponding independent or dependent claims but should not be construed to be a limitation unless expressly recited in a particular claim. Each illustrative embodiment described herein does not necessarily address every object described herein, and each illustrative embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

DETAILED DESCRIPTION OF THE ILLUSTRATED EMBODIMENTS

Figure 1:
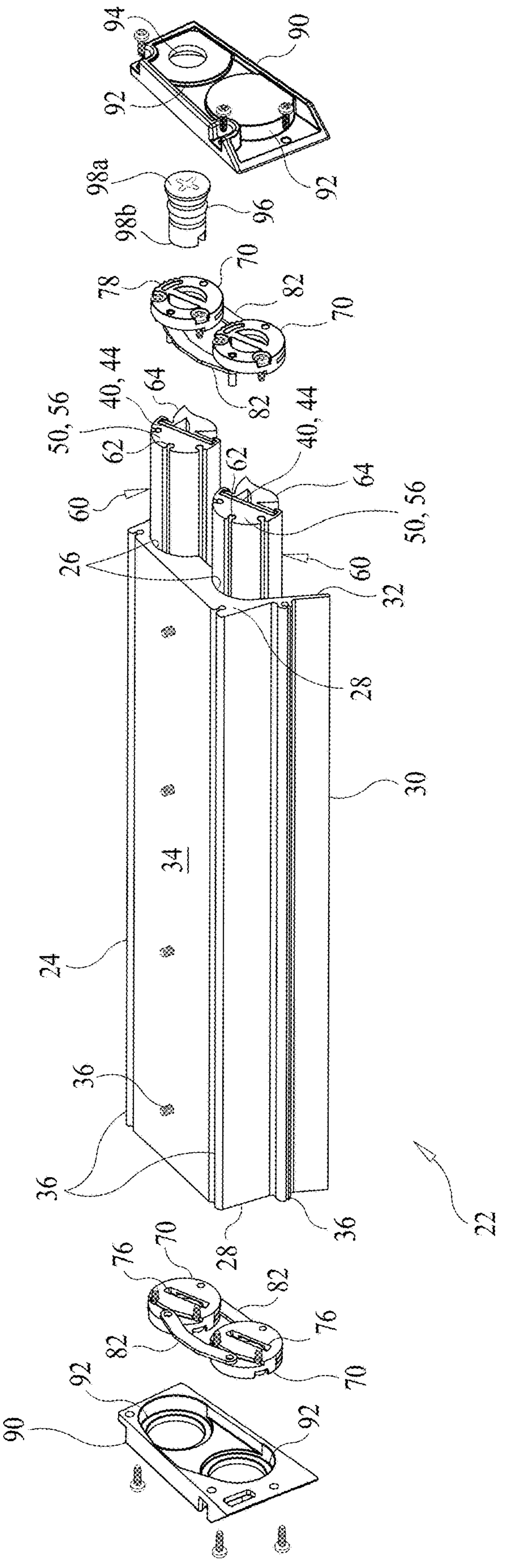
FIG. 1 is a partially exploded front, right side perspective view of an illustrative embodiment of an optical module for a light fixture according to the present disclosure.

For the purposes of promoting an understanding of the principles of the disclosure, reference will now be made to one or more illustrative embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one illustrative embodiment of the disclosure is shown in great detail, although it will be apparent to those skilled in the relevant art that some features or some combinations of features may not be shown for the sake of clarity.

Any reference to “invention” within this document is a reference to an illustrative embodiment of a family of inventions, with no single illustrative embodiment including features that are necessarily included in all embodiments, unless otherwise stated. Furthermore, although there may be references to benefits or advantages provided by some illustrative embodiments, other embodiments may not include those same benefits or advantages, or may include different benefits or advantages. Any benefits or advantages described herein are not to be construed as limiting to any of the claims.

Figure 2:
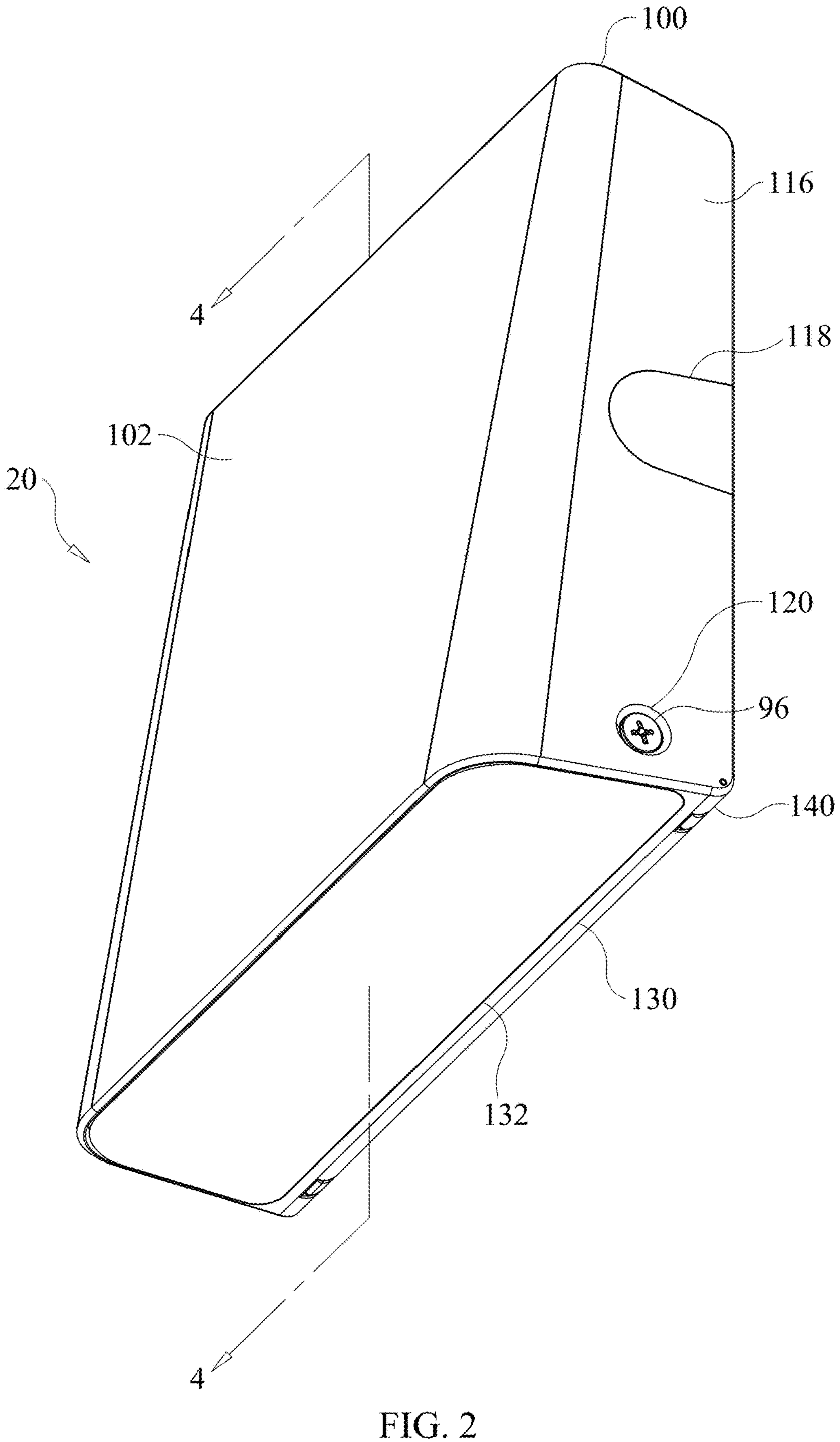
FIG. 2 is a bottom, right side perspective view of an illustrative embodiment of a light fixture enclosing the optical module of FIG. 1 according to the present disclosure.

This disclosure provides a system for rotation of light boards and heat sinks for a light fixture, including optional synchronization of rotation which enables efficient illumination beam redirection or other changes in illumination beam depending on the associated optics. Referring to FIGS. 1 and 2, the primary components of an illustrative embodiment of a light fixture (20) according to the present disclosure include a pair of light emitter members (40) also known as light boards, for example, a printed circuit board populated with light emitters (42-FIG. 6) such as LEDs, each rotationally coupled to a housing (100), and associated with rotatable heat sinks (50) and optional optics (64). The light emitter member (40), rotatable heat sink (50), and optic (64) forms a light emitter assembly. Two or more light emitter assemblies may be mechanically synchronized for rotation, for example, using a synchronization mechanism that may include hubs (70), linkages (82), and hub covers (90), allowing for the desired rotation and illumination beam (14-FIG. 3) redirection without altering the position of the housing or mounting of the light fixture.

Using a pair of smaller light emitter members (40) instead of a single larger light emitter member offers various advantages. First, for the same lumen output, using a pair of light emitter members (40) allows for a more compact design of the optical module (22), which is beneficial for installations where space is limited and also provides more flexibility in improving the aesthetic appearance of the light fixture (20). The smaller light emitter members (40) can be mechanically synchronized for rotation, enabling precise control over the illumination beam direction without increasing the size of the optical module (22). Second, the use of two smaller light emitter members (40) provides greater flexibility in illumination beam adjustment, allowing for more precise and varied lighting configurations. Third, for the same lumen output, the heat generated by the light emitters (42) of the light emitter members (40) can be distributed across multiple structures, i.e., separate light emitter members and separate intermediate rotatable heat sinks (50), thereby improving thermal management of the light fixture (20). Fourth, using a pair of light emitter members (40) allows for a more compact design of the optional optic (64). Thus, this design approach enhances the overall compactness, functionality, and adaptability of the light fixture (20), making it suitable for a wider range of applications.

The light emitter members (40), for example, printed circuit boards (PCBs) or other structures known in the art for supporting light emitters (42) such as LEDs, may be thermally coupled by the rotatable heat sinks (50) to a fixed heat sink (24) that is coupled to the housing (100), for example, thermally and mechanically coupled, ensuring effective heat management for the light emitters (42). The system may also include an actuator (96) for illumination beam angle adjustment, providing user control of the light direction, for example, illuminating a floor (12) shown in FIG. 3, without altering or moving the housing (100) of the light fixture (20) or it's mounting to a wall (10). The light emitter members (40), rotatable heat sinks (50), optics (64), hubs (70), hub covers (90), and fixed heat sink (24) may also form a modular optical module (22) that may be coupled with and enclosed by the housing (100) and a bottom cover (130). This arrangement can provide synchronized illumination beam repositioning, efficient thermal management, and a compact design, enhancing the overall performance, aesthetics, and functionality of the light fixture (20).

Referring now to FIG. 2, in the illustrative embodiment of the light fixture (20), the housing (100) and the bottom cover (130) fully enclose the optical module (22) (not shown). Thus, the housing (100) is structured to contain all moving, e.g., rotating, components. The housing (100) includes a front housing (102), a rear cover (140), a top cover (136-FIG. 8), and a lens (132) defined by at least a portion of the bottom cover (130). The lens (132) is positioned to allow light to be emitted from the housing (100) while also protecting the optical module (22) and other internal components from environmental exposure. The lens (132) may or may not provide an optical effect for the illumination beam passing through it. The housing (100) includes side walls (116) and optional knockouts (118) to accommodate optional locations for supply power conduit connections. The housing (100) also includes an opening (120) defined through one of the side walls (116) that provides access to actuator (96) even after installation of the light fixture (20). Actuator (96) provides user adjustment of the direction, position, span, and/or other features of the illumination beam (14,16) via the optical module (22) as is discussed further below. Thus, the illustrative embodiment of the light fixture (20) enables illumination beam adjustment without repositioning or otherwise altering the housing (100), any external subparts thereof, or it's mounting, for example, to a wall (10).

Figure 3:
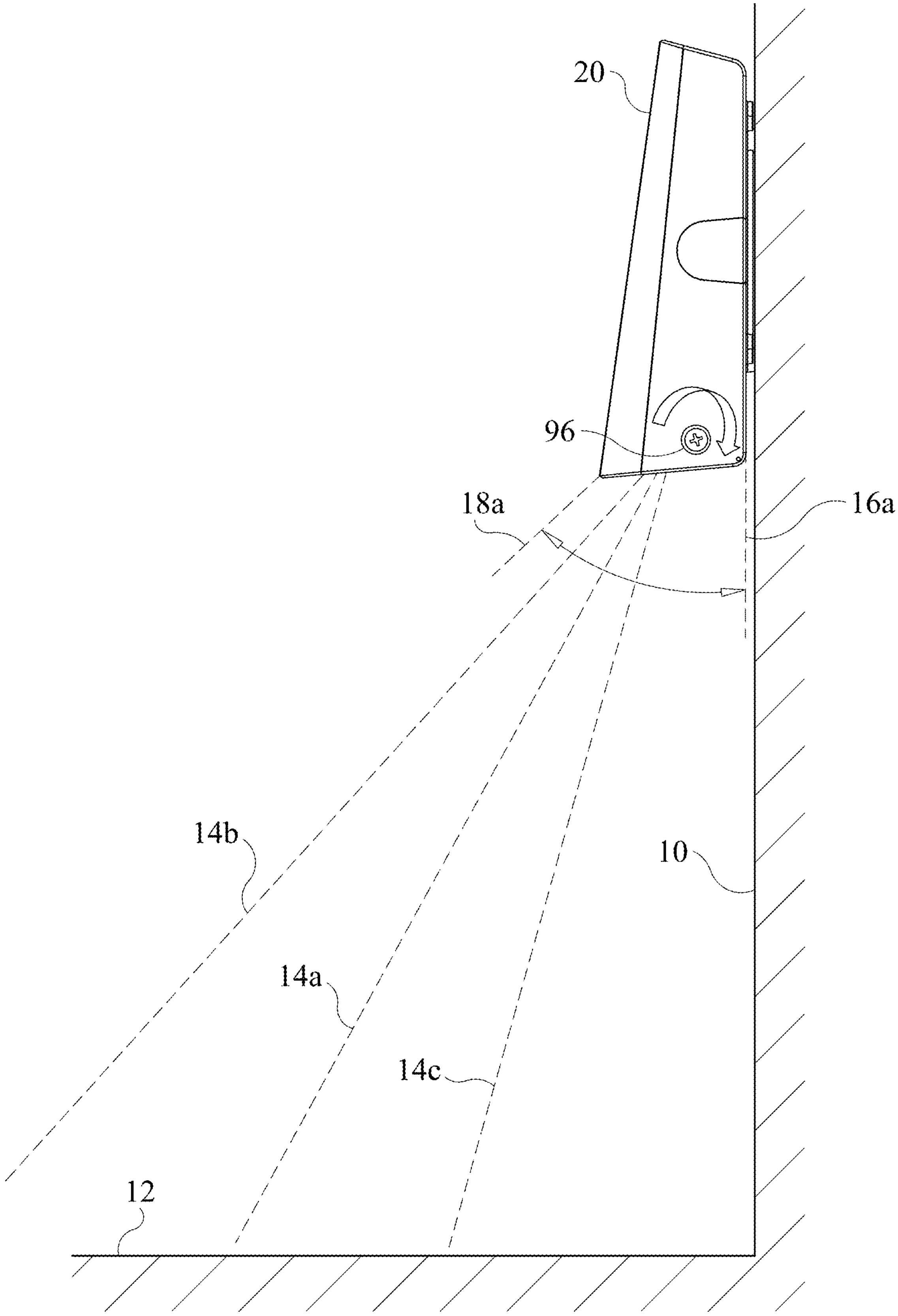
FIG. 3 is a diagrammatic illustration of a right end view of an exemplary beam angle adjustment provided by the light fixture and optical module of FIGS. 1 and 2.

Referring now to FIG. 3, the illustrative embodiment of the light fixture (20) is shown mounted on a wall (10) above a floor (12). As can be understood from the illustration, illumination beam edges (16*a*) and (18*a*) define an illumination beam span, for example, of about 35 degrees that is cast upon the floor (12) and is centered about a forward thrown illumination beam angle (14*a*), for example, about 37.5-degrees forward/away from perpendicular to the wall (10). The illustrative embodiment is configured as a wall pack with an adjustable illumination beam throw and having full-cut-off, i.e., no up light in that no light beam is cast above the bottom cover 130, and little or no light beam is cast upon the wall (10). Illumination beam angle (14*b*) may represent a +20-degree forward throw, i.e., the center of the illumination beam angle is shifted by 20-degrees away from the wall (10), and illumination beam angle (14*c*) may represent a −20-degree throw, i.e., the center of the illumination beam angle is shifted by 20-degrees toward the wall. Alternative angles and/or additional or intermediate selectable illumination beam throws angles in degrees or another unit of measure may also be provided, for example, but not limited to, +20, +10, 0, −10, −20-degrees, for a total of at least 40 degrees. Thus, in this configuration, the angular span between the illumination beam edges (16*a*, 18*a*) of about 35-degrees remains fixed but the throw of the illumination beam cast upon the floor (12) relative to wall (10) is adjustable. In other alternative embodiments, the installation location of the light fixture (20) relative to a floor (12) and/or a wall (10), or configuration of rotatable or fixed optics relative to the light emitter members (40), or alternatives to synchronizations of rotations of the light emitter members (40) may provide only a change in illumination beam span, only a change in the illumination beam angle, a combination of a change in the span and the angle of the illumination beam produced by the light fixture, or a change in another aspect of the illumination beam emanating from the light fixture (20).

As discussed above and noted from FIG. 3, because all moving components required for adjustment of the illumination beam are located internal to the housing (100), no adjustable mounting bracket nor any mounting bracket that extends the housing (100) substantially away from the wall (10) are required as no change in the angle or other positioning of the housing (100) or a subpart of the housing is required to enable adjustment of the illumination beam. The configuration of the illustrative embodiment aligns with the system's concept of synchronized rotation of light boards and heat sinks, enabling precise control over the direction of illumination without altering the external structure of the light fixture (20).

Figure 4:
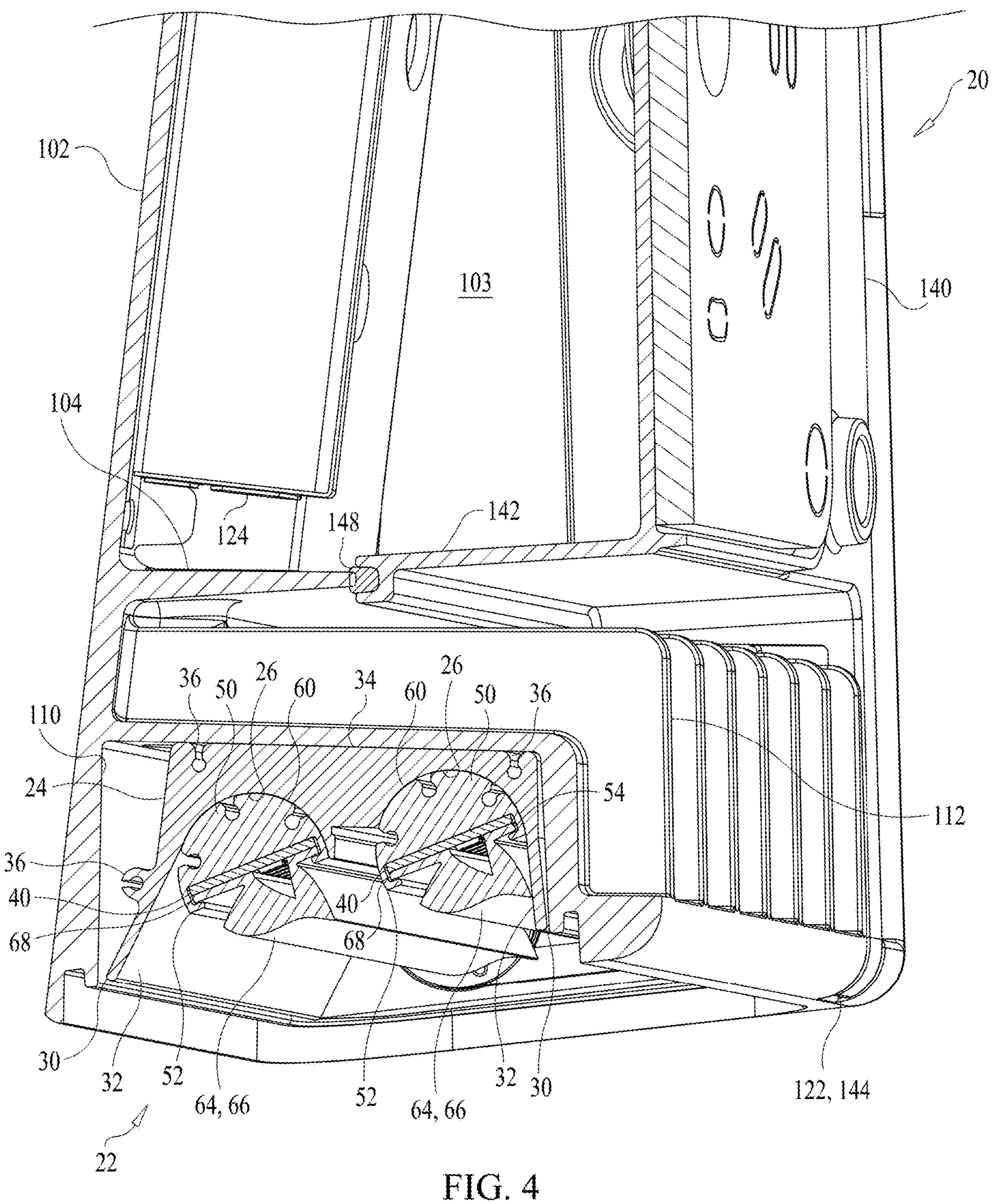
FIG. 4 is a cross-sectional view of the illustrative light fixture taken along sectional cutting plane line 4-4 shown in FIG. 2.

Referring now to FIG. 4, an end sectional view of the illustrative embodiment of the light fixture (20) of FIG. 2 is shown with the bottom cover (130) removed for clarity of view of the optical module (22) portion of the light fixture and of the thermal management aspects of the light fixture. The housing (100) encloses the entire optical module (22), which includes in part the fixed heat sink (24), the rotatable heat sinks (50), the light emitter members (40), and the optics (64). The optical module (22) includes all rotational components, allowing for the adjustment of the illumination beam without moving a portion of or the entire housing (100), as will be discussed in detail further below.

The light emitter members (40) upon which the light emitters (42) are mounted are each in thermal contact with an intermediate rotatable heat sink (50) that rotates with each respective light emitter member. The intermediate rotatable heat sinks (50) are each in rotational thermal contact with the primary fixed heat sink (24), which is in turn in thermal contact with the housing (100). Thus, the thermal management of the light emitters (42) is facilitated by the thermal interaction between the light emitter members (40), the rotatable heat sinks (50), the fixed heat sink (24), and the housing (100). These components are structured and arranged to be thermally coupled even upon relative rotation of the light emitters (40) and rotatable heat sinks (50) relative to the fixed heat sink (24) to ensure efficient heat management of the light emitters (42) and the light fixture (20) overall.

Figure 5:
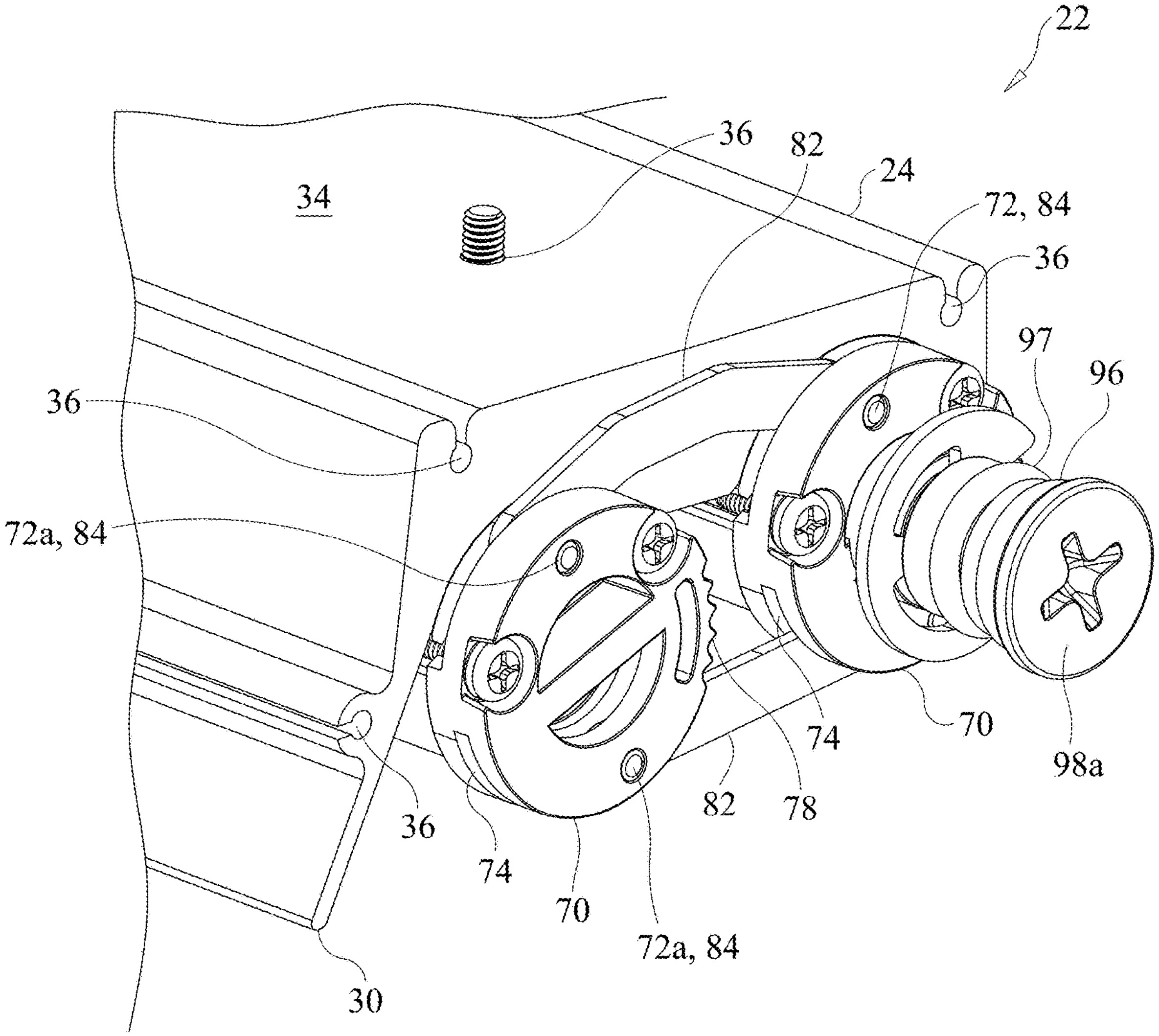
FIG. 5 is a partially assembled right side perspective view of the illustrative light module of FIG. 1 shown with an end hub cover removed.
Figure 7:
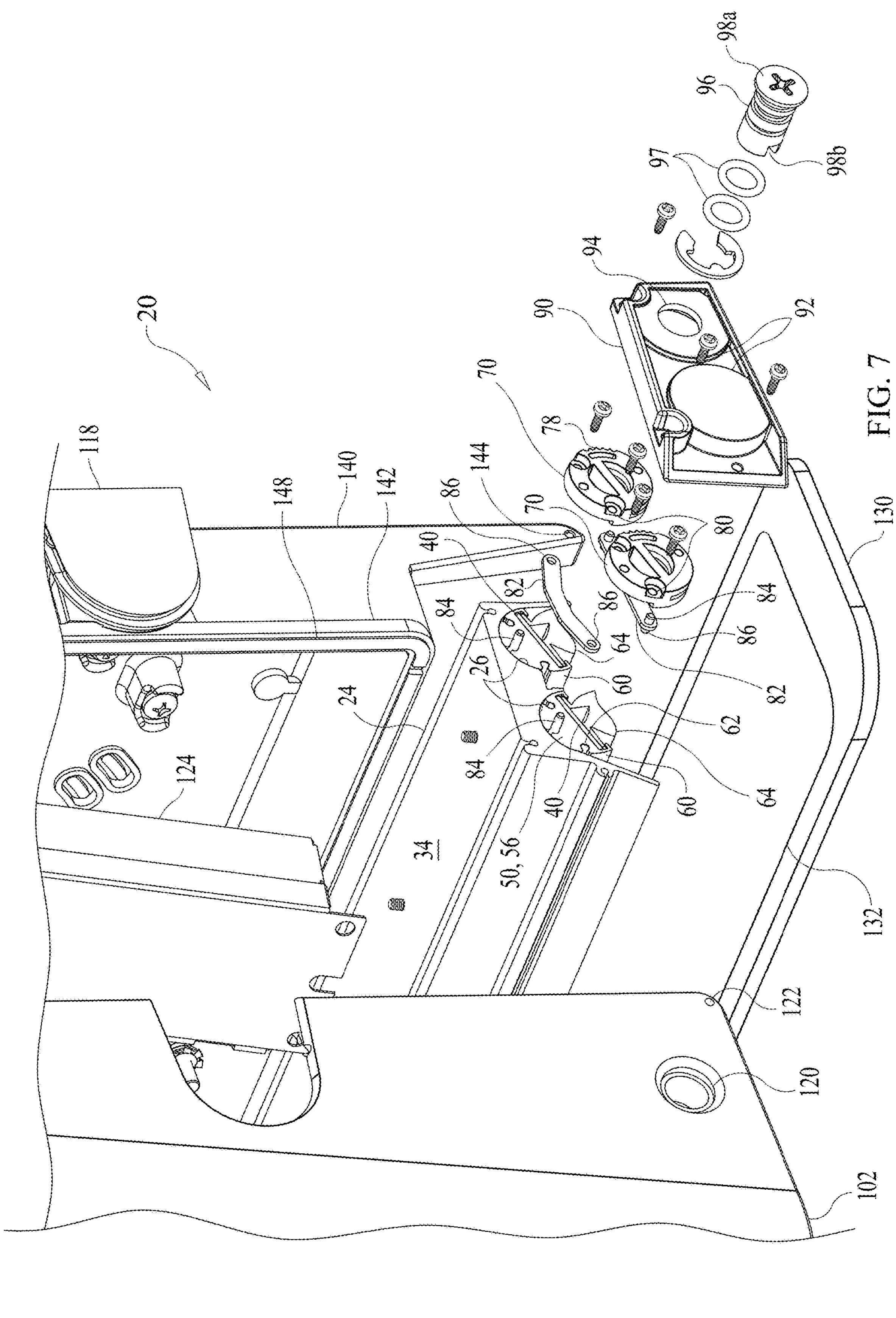
FIG. 7 is a partially exploded front, right side perspective view of the light fixture and optical module of FIGS. 1 and 2.

Referring still to FIG. 4, the fixed heat sink (24) is stationary and is thus fixedly coupled within the housing (100), for example, with threaded fasteners or other mounting features (36) as illustrated in FIGS. 5 and 7. The fixed heat sink (24) may include one or more thermally conductive surface (34) that is in direct contact with a portion of the housing (100), for example, the front housing (102) proximate and/or adjacent to the cooling fins (112), for example, extending from an outer surface of the housing (100) defined on a wall opposite the fixed heat sink, thereby conducting heat out of the light fixture (20) and into the surrounding environment. The thermal contact and conduction between the fixed heat sink (24) and the front housing (102) may be optionally enhanced with a material such as thermal paste (not show) or alternatively the fixed heat sink (24) may be integrally formed with a portion of the housing (100), for example, the front housing (102) or the rear cover (140). Similarly, the thermal contact and conduction between each light emitter member (40) and the respective rotatable heat sink (50) may be optionally enhanced with a material such as thermal paste (not show) or alternatively the rotatable heat sink (50) may be integrally formed with the light emitter member (40).

The fixed heat sink (24) defines thermally conductive surfaces (26) that are shaped to maintain contact with correspondingly shaped thermally conductive surfaces (60) defined by the rotatable heat sinks (50) upon rotation of the rotatable heat sink, for example, through a range of rotation of at least +/−20-degrees, through a range of rotation of at least +/−45-degrees, or through a range of rotation of at least +/−90-degrees. This structural arrangement provides efficient heat transfer and dissipation for the rotational light emitter assemblies, which each include at least the light emitter member (40), the rotatable heat sink (50), and the optional optic (64), enabling reliable longevity and continuing performance of the light emitters (42).

Figure 9:
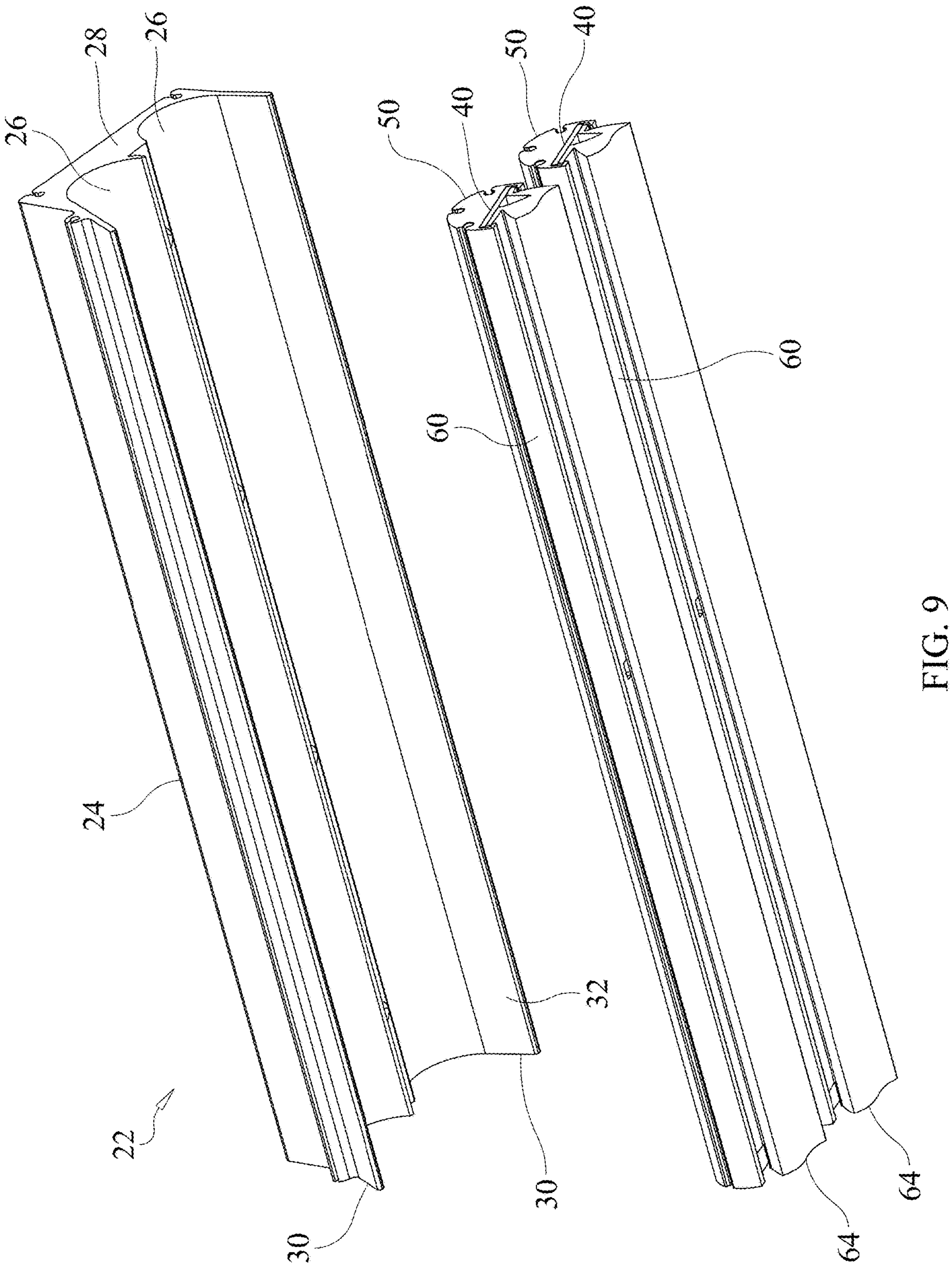
FIG. 9 is a partially exploded bottom perspective view of a portion of the optical module of FIG. 1.

Referring to FIG. 9, the thermally conductive surfaces (60) of the intermediate rotatable heat sinks (50) may be received by a correspondingly shaped thermally conductive surface (26) in the form of a thermally conductive recess formed by the primary fixed heat sink (24). For example, in the illustrative embodiments of this disclosure the rotatable heat sinks (50) are semicylindrical shaped, for example, forming a half-cylinder. Similarly, and complimentarily, the corresponding thermally conductive surfaces (26) are in the form of a recess defined by the fixed heat sink (24) can be semicylindrical in shape, for example, forming a pair of parallel half-cylinder recesses to receive two rotatable heat sinks (50). This nesting configuration allows for the transfer of heat from the rotating portion of the optical module (22), i.e., the light emitter assembly, to the non-rotating portion of the optical module, i.e., the primary fixed heat sink (24), throughout a desired range of rotational motion of the rotatable heat sinks (50) and their associated light emitter members (40), which contributes substantially to maintaining the compact design of the light fixture (20). Advantageously, and as understood from FIG. 9, the thermally conductive surface (60) of each rotatable heat sink (50) can extend at least the full length of the associated light emitter member (40), and each thermally conductive surface (26) of the fixed heat sink (24) can extend at least the full length of each associated rotatable heat sink (50).

In an alternative embodiment (not shown) the rotatable heat sinks (50) may include a thermally conductive surface (60) defining a recess in which a protruding thermally conductive surface (26) of the fixed heat sink (24) nests. For example, the rotatable heat sinks (50) may define a semicylindrical shaped recess which rotates upon a semicylindrical shaped protrusion defined by the fixed heat sink (24). In addition to cylindrical or semicylindrical shaped thermally conductive surfaces (34, 62), alternative embodiments (not shown) may include, for example, spherical, semispherical, or conical corresponding shapes. Also, in one alternative embodiment, the primary fixed heat sink (24) may include further distinct and separate structures for rotational coupling to each of the rotatable heat sinks (50), for example, two primary fixed heat sinks that each couple with a respective one of two rotatable heat sinks. Semicylindrical is understood to be a cylindrical shaped surface that may extend more than or less than 180-degrees, while a half-cylinder is understood to be a cylindrical shaped surface that extends about 180-degrees.

Still referring to FIG. 4, in the illustrative embodiment of the light fixture (20), the fixed heat sink (24) also includes extensions (30) projecting downwardly and outwardly that optionally form reflective surfaces (32) and optionally limit the span of the illumination beam by providing a physical structure that shields the light from transmission beyond the extension, for example, to provide desired full-cutoff of the illumination beam. The rotatable heat sink (50) may define a pair of flanges (52) defining recesses (54) for receiving and retaining edges of light emitter member (40) and edges of mounting base (68) of the optic (64). The flanges (52) and recesses (54) also contribute to or may solely maintain physical and thus thermal contact between the light emitter member (40) and the rotatable heat sink (50).

Figure 6:
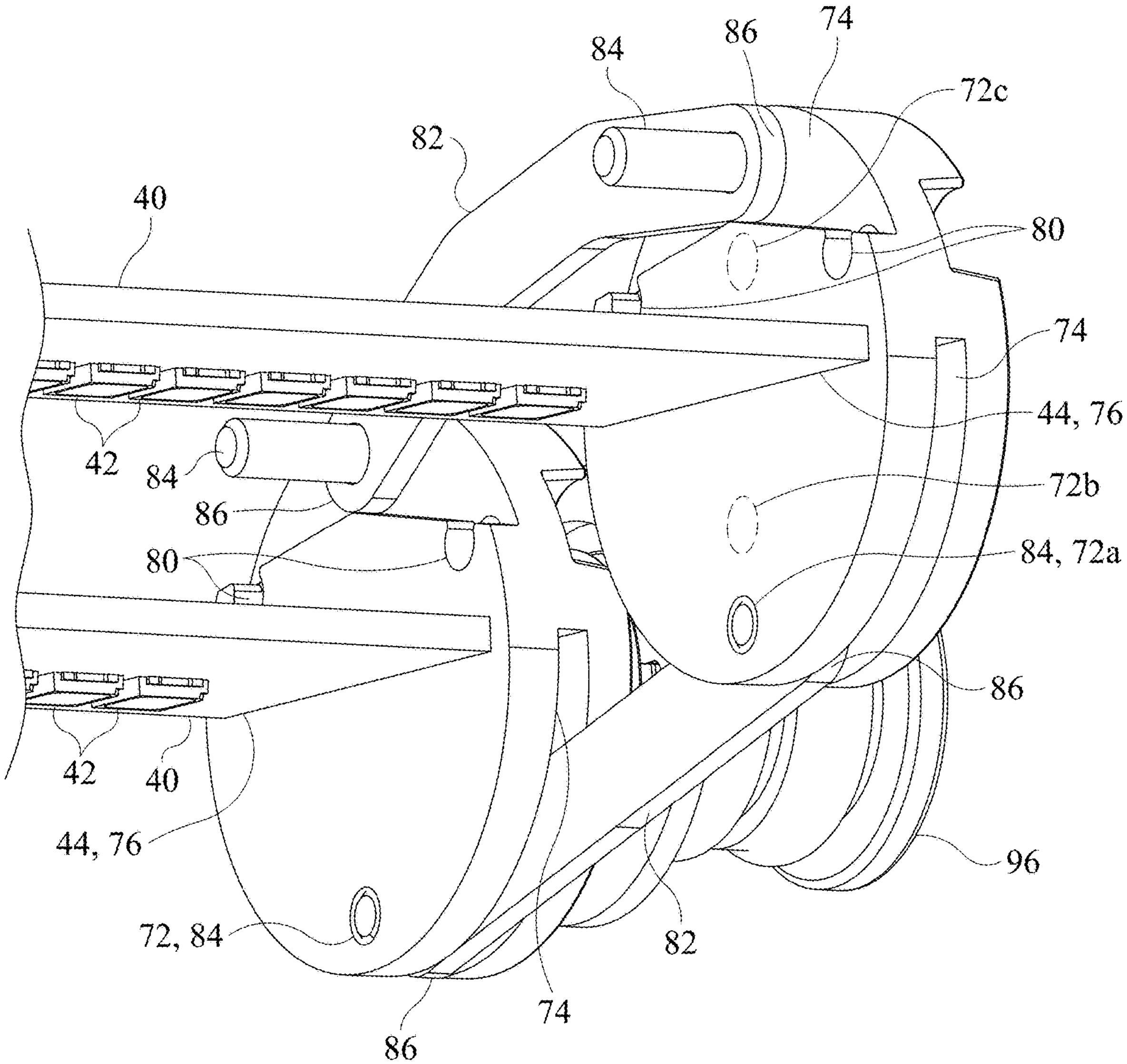
FIG. 6 is a partially assembled front perspective view of the illustrative light module of FIG. 1 shown with the heat sinks and end hub cover removed.

Referring to FIGS. 5-7, the use of tandem light emitter members (40) facilitates the desired rotation and illumination beam redirection and provides various advantages discussed above. The optional synchronization of rotation of the light emitter members (40) of the optical module (22) may be provided by a synchronization mechanism that can include hubs (70), linkages (82), and hub covers (90) located at each end of the optical module (22) and as is best illustrated in the partially exploded view of FIG. 1. The synchronization mechanism is designed to precisely support and mechanically synchronize the rotation of the light emitter members (40), rotatable heat sinks (50), and optics (64), i.e., the light emitter assemblies, which are enclosed within the housing (100) of the light fixture (20).

Recognizing there are many ways known in the art to support a device for rotation about an axis, in this case the longitudinal axis of the light emitter boards, the term "hub" is understood broadly as used herein, and may include elements such as a wheel, an axle, a spindle, and the like, all of which can provide support for rotation about the longitudinal axis of each light emitter member (40) along with the associated rotatable heat sink (50) and optic (64). In the illustrative embodiment, the hubs (70) take a circular wheel- or disk-like form and are mechanically secured to each end (56) of the rotatable heat sinks (50) and are received into and held in place to allow rotation about the longitudinal axis of each the light emitter member (40) by hub guides (92) defined by hub covers (90) located at opposites ends of the optical module (22). As understood from FIG. 1, the hub covers (90) may be secured to the ends (28) of the fixed heat sink (24), for example, by fasteners anchored into mount features (36), for example, circular slots defined by the fixed heat sink. In alternative embodiments the hub could simply be defined by the ends (44 and 56) of the respective light emitter member (40) and rotatable heat sink (50). Alternatively, the hub can take the form of an axle, shaft, spindle, or other rotational means coupled to hub covers (90) or another fixed portion of the housing (100) to fix the light emitter assemblies in place and enable rotation about the longitudinal axis of the light emitter member (40).

Still referring to FIGS. 5-7, a hub (70) is coupled, for example, secured, to each end (44) of each light emitter member (40) and rotatable heat sink (50). In the illustrative embodiment, fasteners that extend through bores (80) defined through the hubs are anchored in mounting feature (62) of the rotatable heat sink (50), securing the each hub (70) to an end (44) of the light emitter member (40). In the illustrative embodiment, the mounting feature (62) are circular slots defined adjacent the thermally conductive surface (60) of the rotatable heat sink (50), providing a bore to receive and anchor fasteners and ensuring secure attachment and alignment of the hub (70) for synchronized rotation. The hub (70) may also define a recess (76) to receive an end (44) of the light emitter member (40) as shown in the left end of FIG. 1 and in FIG. 6. The hub (70) may also define detents (78) that interact with a complimentary structure defined by the hub guide (92) of the hub cover (90) to provide resistance to rotation in the form of incremental stops that can be overcome with sufficient torque. The hub (70) may also define linkage receiver locations (72) for coupling a rigid linkage (82) and also define slots and/or recesses (74) for receiving a rigid linkage (82) therein.

One or more rigid linkages (82) may be used to couple the hubs (70) to provide synchronization of rotation of the light emitter members (40). In the illustrative embodiment, two rigid linkages (82) are coupled between each tandem pair of hubs (70) to provide the same rate and direction of rotation for each of the light emitter assemblies, one across an upper portion of the tandem pair of hubs (70) and another across the lower portions of the tandem pair of hubs (70) as shown in FIGS. 5-6. Referring to FIG. 6, in the illustrative embodiment the opposite ends (86) of each rigid linkage (82) is coupled by connectors (84) to respective linkage receiver locations (72) and (72*a*) which are located at the same radius from a center of the two hubs (70). Optionally, one or more of the connectors (84) may extend into a mounting features (62) (discussed above) of the rotatable heat sinks, as is best understood from FIGS. 1 and 6, to further secure and strengthen the synchronization of the two light emitter assemblies.

In an alternative embodiment, the rigid linkages (82) can be coupled to the hubs (70) so as to provide a different rate and/or direction of rotation for each of the light emitter assemblies. For example, the rigid linkage (82) that can couple the hubs (70) at different radii from the center of the hubs, thereby providing a different rate of rotation for each of the light emitter assemblies, thereby also adjusting the span of the illumination beam. By way of further example, the rigid linkage (82) may be attached to each of the hubs (70) on opposite halves at the same or different radii, thus providing a different direction of rotation for each of the light emitter assemblies. For example, referring to FIG. 6, in the illustrative embodiment a rigid linkage (82) is coupled by connectors (84) to linkage receiver location (72) and (72*a*) which are located at the same radius from a center of the two hubs (70). In alternative embodiments, the rigid linkage (82) may be coupled at one end to linkage receiver (72*b*), which would provide different rates of rotation for the two light emitter members (40), or the rigid linkage 82 may be coupled at one end to linkage receiver (72*c*), which would provide different directions of rotation for the two light emitter members (40).

In an alternative embodiment the linkage (82) rotationally coupling the hubs (70) may be non-rigid, for example, a chain cooperating with gear teeth defined by the hubs, or a elastomeric belt received by guides defined by the hubs.

Referring to FIGS. 5 and 7, according to the illustrative embodiment of the light fixture (20), an actuator (96) may be used to enable selection of the rotation of the rotatable light emitter member (40). As shown in FIGS. 2 and 3, the actuator may pass through an opening (120) defined through the side wall (116) of the front housing (102), thereby enabling adjustment of the illumination beam even after installation of the light fixture (20), for example by mounting to a wall (10) and without having to open or otherwise access an interior portion of the housing (100). As shown in FIG. 7, the actuator (96) may define a common driver recess at a first end (98*a*) so that a common hand tool driver may be used to rotate actuator (96) and adjust the illumination beam, for example, Phillips-type crossed recesses. Additionally, an opposite end (98*b*) of the actuator (96) may pass through a bore (94) defined in the hub cover (90) and define an engagement feature for coupling with and rotating a hub (70). Along a body of the actuator (96) one or more seals (97), for example elastomeric O-rings, may provide a watertight or other environmental seal with the housing side wall (116) thereby preventing water or other environmental intrusion into an interior of the housing (100) around the actuator (96).

Referring to FIGS. 3 and 4, the optical design of the illustrative embodiment of the light fixture (20) is optimized to provide a symmetrical illumination beam having a relatively narrow beam span of about 35-degrees between light beam edges 16*a* and 18*a*, being forward thrown and centered along light beam angle 14*a*, which is about 37.5-degrees forward of perpendicular to wall (10) (and perpendicular to light emitter member (40)), and providing full cut-off, i.e. no up light. In the illustrative embodiment, each light emitter member (40) includes a single row of light emitters (42) extending between the opposite ends (44) of the light emitter member (40). The optical body (66) of the optic (64) is designed to provide both the above discussed beam span and forward throw from the single row of light emitters (42). The combination of the design of the optical body (66) and the optical body and the light emitters (42) being recessed between the pair of downward extending extensions (30) and reflective surfaces (32) defined by the fixed heat sink (24) and recessed within the housing (100) reduces light scatter and provides full cut-off, preventing any up light and directing most light to the floor (12) and away from the wall (10).

To increase illumination and ensure long life of the light emitters (42), a second row of light emitters (42) is desired; however, to maintain an efficient optical design that operates under an assumed point source of light, a separate optic (64) is provided for the second row of light emitters (42). Additionally, as discussed above, to maximize the compactness while provide adjustment of the light beam via light emitter member (40) rotation and to maximize heat transfer from the light emitters (42), a separate light emitter member (40) is used in the illustrative embodiment for the second row of light emitters (42). As discussed above, in the illustrative embodiment, synchronized rotation of the two light emitter members (40) provides adjustment of the throw angle the illumination beam is centered on. More specifically, illumination beam angle (14*b*) may represent a +20-degree forward throw for a total of above 57.5-degrees, i.e., the center of the illumination beam angle is titled a total of about 57.5-degrees away from the wall (10), and illumination beam angle (14*c*) may represent a −20-degree throw for a total of 17.5-degrees away from the wall (10), i.e., the center of the illumination beam angle is tilted a total of about 17.5-degrees away from the wall. An alternative central and/or alternative adjustment angles and/or additional or intermediate selectable illumination beam throws angles in degrees or another unit of measure may also be provided, for example, but not limited to, +20, +10, 0, −10, −20-degrees.

In the illustrative embodiment the optic (64) includes a mounting base (68) extending from each side of the base of the optical body (66). The mounting base (68) may be used to secure the optic (64) with the light emitter member (40). For example, the rotatable heat sink (50) may define a pair of flanges (52) defining recesses (54) for receiving and retaining edges of the light emitter member (40) and edges of the mounting base (68) of the optic (64), thus ensuring the rotatable heat sink, light emitter member, and optic are fixed together and rotate together. By providing the rotating optic (64) internal to the housing (100) of the light fixture (20), the lens (132) shown in FIG. 2 and located at bottom cover (130) can be a fixed, flat, transparent glass or plastic lens that simply functions as an environmental seal and aesthetic cover for the bottom cover of the housing.

Figure 8:
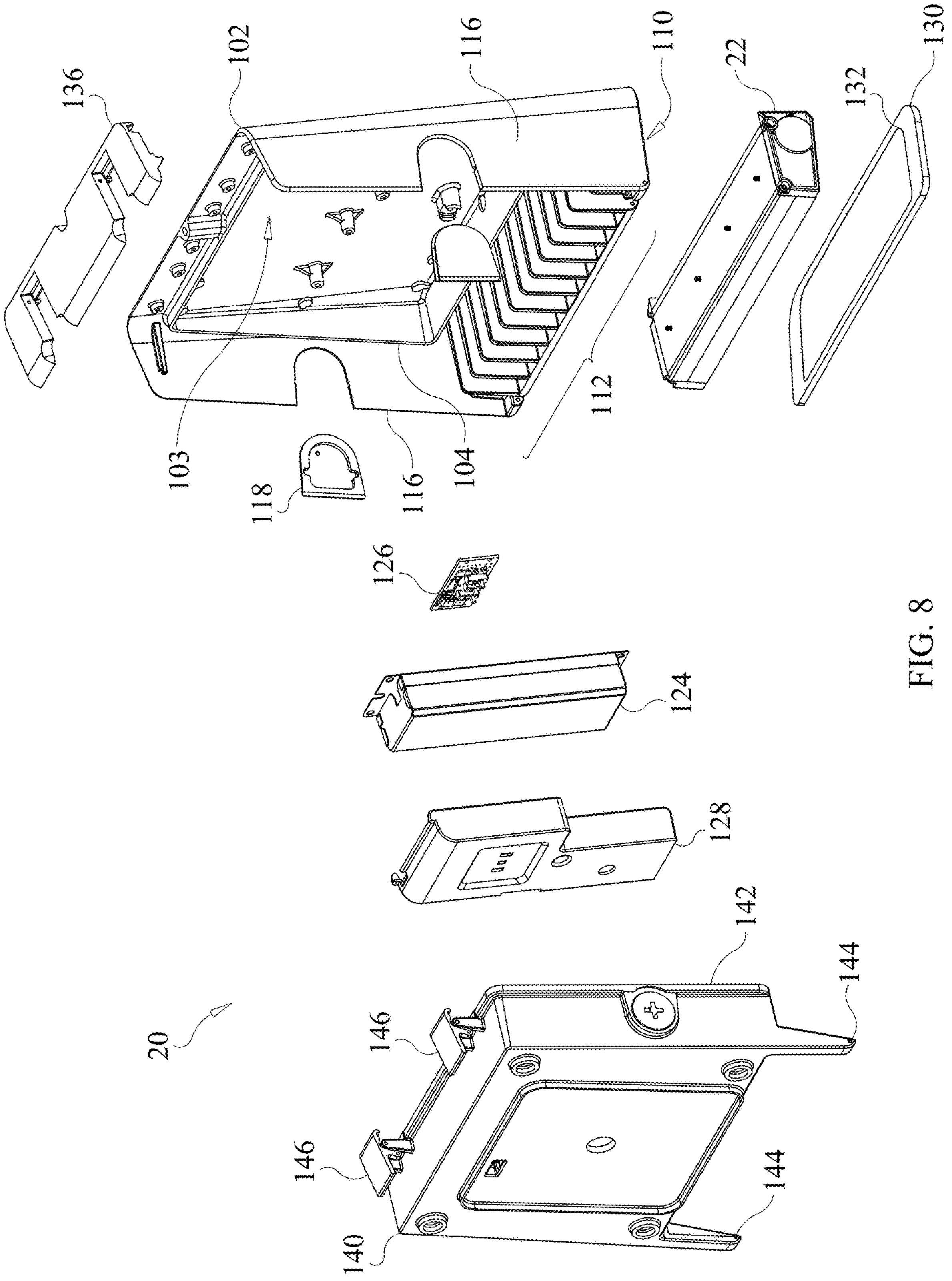
FIG. 8 is a partially exploded rear, left side perspective view of the light fixture and optical module of FIGS. 1 and 2.

Referring now to FIGS. 7 and 8, these partially exploded perspective views of the light fixture (20) illustrate further aspects of the housing (100) that along with the cross-sectional view of FIG. 4, illustrate how the optical module (22) and other internal components are enclosed and are sealed from the environment around the light fixture (20) by the housing. The front housing (102) defines a module receptacle (110) for receiving and enclosing the optical module (22), which includes the light emitter members (40), rotatable heat sinks (50), optics (64), hubs (70), hub covers (90), and the fixed heat sink (24). Advantageously, the fixed heat sink (24) is in direct thermal contact with a portion of the housing (100), for example, the portion of the front housing (102) proximate and/or adjacent to the cooling fins (112), for example, extending from an outer surface of the housing (100) defined on a wall opposite the fixed heat sink, thereby conducting heat out of the light fixture (20) and into the surrounding environment. Additionally, as understood from FIGS. 4 and 7, the bottom cover (130) including lens (132) encloses the optical module (22) fully within the module receptacle (110), thereby sealing it from the outside environment, other than the thermal heat conduction provided by the various structures.

Referring now to FIG. 4, the front housing (102) and rear cover (140) each define a perimeter wall (104 and 142) that meet at perimeter seal (148) forming a sealed power area (103) that encloses a power supply (124), for example an LED driver, and a control interface (126). Now referring to FIG. 8, in the illustrative embodiment, the front housing (102) and rear cover (140) are hinged at the bottom by respective hinge features (122 and 144) and are secured in the closed position at the top by latch (146) and top cover (136). The power supply (124) and control interface (126) may also be further covered within the sealed power area (104) by a protective cover (128) that further limits access and any potential shock hazard or electrical damage to the control interface (126) from line voltage or electrostatic discharge.

The term 'about' for units of measure in degrees is understood to be +/−5-degrees.

The various components of the housing (100) can be formed from a cast metal such as an aluminum alloy, with the exception of the bottom cover (130) and/or lens (132) which can be formed from a transparent material such as glass or a plastic such as acrylic. The fixed heat sink (24) and rotatable heat sink (50) may be formed from an extruded metal such as an aluminum alloy. The various components of the synchronization mechanism, including the hub (70), linkage (82), and hub cover (96) may be formed from a rigid plastic or a metal. The optic (64) may be extruded from a plastic such as polymethyl methacrylate (PMMA).

While examples, one or more illustrative embodiments and specific forms of the disclosure have been illustrated and described in detail in the drawings and foregoing description, the same is to be considered as illustrative and not restrictive or limiting. The description of particular features in one illustrative embodiment does not imply that those particular features are necessarily limited to that one illustrative embodiment. Some or all of the features of one embodiment can be used or applied in combination with some or all of the features of other embodiments unless otherwise indicated. One or more illustrative embodiments have been shown and described, and all changes and modifications that come within the spirit of the disclosure are desired to be protected.

What is claimed is:

1. A light fixture, comprising:

a housing;

at least two light emitter assemblies rotationally coupled to the housing, each of the at least two light emitter assemblies comprising a light emitter member and a rotatable heat sink;

a fixed heat sink coupled within the housing, the fixed heat sink defining at least two thermally conductive surfaces shaped to remain in continual contact with respective ones of the rotatable heat sinks upon rotation of the at least two light emitter assemblies; and a synchronization mechanism coupled to each of the at least two light emitter assemblies to synchronize rotation of the at least two light emitter assemblies.

2. The light fixture of claim 1, wherein each of the at least two light emitter assemblies further comprises an optic.

3. The light fixture of claim 1, wherein each of the rotatable heat sinks is thermally coupled to a back side of a respective one of the light emitter members and defines a semicylindrical thermally conductive surface for contacting and thermal coupling with a respective one of the at least two thermally conductive surfaces of the fixed heat sink.

4. The light fixture of claim 1, wherein the synchronization mechanism includes a linkage rotationally coupling the at least two light emitter assemblies.

5. The light fixture of claim 4, wherein:

the synchronization mechanism includes a hub coupled to an end of each of the at least two light emitter assemblies; and the linkage is rigid and rotationally couples the hubs.

6. The light fixture of claim 5, wherein the linkage couples to each of the hubs at a different radius from a center of the hubs, thereby providing a different rate of rotation for each of the at least two light emitter assemblies.

7. The light fixture of claim 5, wherein the linkage couples to each of the hubs on opposite halves of the hubs, thereby providing a different direction of rotation for each of the at least two light emitter assemblies.

8. The light fixture of claim 1, further comprising an optical module comprising the at least two light emitter assemblies, the fixed heat sink, and the synchronization mechanism.

9. The light fixture of claim 8, further comprising:

a lens; and an actuator coupled to the synchronization mechanism, accessible from an exterior of the housing, and enabling rotation of the at least two light emitter assemblies;

wherein the housing and the lens enclose the optical module.

10. The light fixture of claim 1, wherein each of the rotatable heat sinks defines a half-cylinder.

11. A light fixture, comprising:

a housing;

a first light emitter member rotationally coupled to the housing;

a first intermediate heat sink defining a first semicylindrical heat transfer surface, the first intermediate heat sink fixedly and thermally coupled to the first light emitter member;

a primary heat sink fixedly coupled to the housing and defining a second semicylindrical heat transfer surface for contacting and thermally coupling with the first semicylindrical heat transfer surface of the first intermediate heat sink; and an actuator coupled to the first light emitter member enabling rotation of the first light emitter member to alter a light beam emitter from the housing;

wherein the first intermediate heat sink remains in contact with and thermally coupled to the primary heat sink upon rotation of the first light emitter member.

12. The light fixture of claim 11, further comprising an optical module comprising the first light emitter member, the first intermediate heat sink, and the primary heat sink.

13. The light fixture of claim 12, further comprising a lens and wherein the housing and the lens enclose the optical module.

14. The light fixture of claim 12, wherein the actuator is configured with the housing such that the actuator is accessible from outside the housing to enable changing a rotation position of the first light emitter member.

15. The light fixture of claim 11, further comprising:

a second light emitter member rotationally coupled to the housing; and a second intermediate heat sink defining a third semicylindrical heat transfer surface, the second intermediate heat sink fixedly and thermally coupled to the second light emitter member;

wherein the primary heat sink further defines a fourth semicylindrical heat transfer surface for contacting and thermally coupling with the third semicylindrical heat transfer surface of the second intermediate heat sink.

16. The light fixture of claim 15, further comprising a synchronization mechanism including a linkage rotationally coupling the first and the second light emitter members.

17. The light fixture of claim 16, wherein:

the synchronization mechanism includes a first and a second hub;

the first hub is mounted to an end of at least one of the first light emitter member and the first intermediate heat sink;

the second hub is mounted to an end of at least one of the second light emitter member and the second intermediate heat sink; and the linkage is rigid and is attached to the first and second hubs.

18. The light fixture of claim 17, wherein the linkage is attached to the first and second hubs at different radii from a center of the first and second hubs, thereby providing a different rate of rotation for each of the first and second light emitter members.

19. The light fixture of claim 17, wherein the linkage is attached to each of the first and second hubs on opposite halves of the first and second hubs, thereby providing a different direction of rotation for each of the first and second light emitter members.

20. The light fixture of claim 15, wherein the first and second intermediate heat sinks remain in contact with and thermally coupled to the primary heat sink throughout a range of rotation of the first and second light emitter members of at least 40 degrees.

21. The light fixture of claim 11, further comprising:

a first plurality of light emitters mounted to the first light emitter member;

wherein:

the first semicylindrical heat transfer surface spans a full length of the first plurality of light emitters; and the second semicylindrical heat transfer surface spans a full length of the first semicylindrical heat transfer surface.

22. A light fixture, comprising:

a housing; and an optical module coupled to the housing and including:

a first light emitter member rotationally coupled to the optical module;

a first intermediate heat sink defining a first semicylindrical heat transfer surface, the first intermediate heat sink fixedly and thermally coupled to the first light emitter member;

a second light emitter member rotationally coupled to the optical module;

second intermediate heat sink defining a second semicylindrical heat transfer surface, the second intermediate heat sink fixedly and thermally coupled to the second light emitter member;

a primary heat sink fixedly coupled to the housing and defining a third and a fourth semicylindrical heat transfer surface for respectively contacting and thermally coupling the first and second semicylindrical heat transfer surfaces of the first and second intermediate heat sinks;

a first hub defined at an end of at least one of the first light emitter member and the first intermediate heat sink;

a second hub defined at an end of at least one of the second light emitter member and the second intermediate heat sink;

a linkage rotationally coupling the first and second hubs; and an end cover coupled to an end of the primary heat sink and defining guides for receiving and guiding the first and second hubs; and an actuator coupled to one of the first and second hubs and enabling rotation of the first and second light emitter members;

wherein:

the first intermediate heat sink remains in contact with and thermally coupled to the primary heat sink upon rotation of the first light emitter member; and the second intermediate heat sink remains in contact with and thermally coupled to the primary heat sink upon rotation of the second light emitter member.

23. The light fixture of claim 22, further comprising a lens and wherein the optical module is enclosed by the housing and the lens.

* * * * *